Oct. 3 1967 G. F. M. CHRISTOL 3,345,638

PHASE MODULATION BINARY RECORDING SYSTEM

Filed Oct. 26, 1964 4 Sheets-Sheet 1

Inventor:
Guy Fernand Marie Christol
By: Baldwin & Wight
Attorneys

PHASE MODULATION BINARY RECORDING SYSTEM

Filed Oct. 26, 1964

Inventor:
Guy Fernand Marie Christol
By: Baldwin + Wight
attorneys

Inventor:
Guy Fernand Marie Christol
By:
Baldwin + Wight
Attorneys

PHASE MODULATION BINARY RECORDING SYSTEM

Filed Oct. 26, 1964 4 Sheets-Sheet 4

Inventor:
Guy Fernand Marie Christol
By: Baldwin + Wight
attorneys 3,345,638
PHASE MODULATION BINARY RECORDING SYSTEM Guy F. M. Christol, Paris, France, assignor to Compagnie des Machines Bull (Societe Anonyme), Paris, France
Filed Oct. 26, 1964, Ser. No. 406,525
Claims priority, application France, Nov. 5, 1963, 952,688, Patent 1,387,879
5 Claims. (Cl. 346—74)

The invention relates to improvements in control arrangements for writing on a magnetisable medium by the process known as "phase modulation."

It will be recalled that this method of recording binary values is characterised by the fact that the value "1," for example, is attributed to a reversal of magnetisation in one direction at the middle of a digit cell, and the other binary value, i.e. "0," to a reversal of magnetisation in the opposite direction.

When a recording effected by phase modulation with high recording density is read, the reading signal emanating from the reading head is composed of substantially sinusoidal waves in which the frequencies F and $F/2$ are found. After adequate amplification and differentiation, there are distinguished in the curve representing the reading signal crossings of the zero voltage level at points which correspond approximately to the said reversals of magnetisation, and in addition reversals of magnetisation which may exist as far as the digit cell limits on the magnetisable medium moving under the reading head. Measurements of time intervals between the said level crossings may be effected for the purpose of monitoring the generation of self-synchronising pulses, as also the discrimination of the "1's" and "0's" read.

Errors in interpretation may be found in the reading by reason of various causes which are ultimately assimilable to variations of the distance between the magnetic layer and the reading head. On oscilloscopic examination of the amplified reading signal, it is found that the reading faults are accompanied by a forward shift of a level crossing corresponding to a cell limit when the latter is followed by a change of binary digit. In addition, the errors in interpretation are more numerous when the magnetic tape is read backwards, i.e. when it is moved in the direction opposite to that in which it was moved during the writing.

It is known that, in the graphic representation of the writing current passed through the winding of the reading head, so-called "significant" edges are distinguished at the middle of each digit cell. Conventionally, a positive-going edge of this type may represent the binary "1," and a negative-going edge of this type therefore represents the binary "0." Also, so-called "non-significant" edges are distinguished, which may represent digit cell limits. Such an edge exists, in positive-going or negative-going form, when the two neighboring digits are identical, i.e. are both 0 or both 1. Such an edge does not exist when the two neighbouring digits are different, i.e. when the corresponding limit coincides with a change of digit, or a change from 1 to 0 or vice versa.

A known writing control arrangement comprises essentially a bistable flip-flop and a register containing successively the "1's" and the "0's" of the information to be written. This flip-flop is provided with a "symmetrical" input to which is applied a timing pulse train at the frequency F, each pulse of this timing train having the effect of reversing the state of conduction of the flip-flop at the middle of each cell. The flip-flop comprises in addition two "unsymmetrical" or "separate" inputs adapted to receive pulses of a second timing pulse train, of frequency F, which are offset by one digit half period in relation to those of the first timing pulse train. Each of these two inputs is so arranged that the applied pulses is capable of changing over the flip-flop only if the latter is already in a predetermined state of conduction. Finally, logical circuits influenced by the said register control the effective application of the latter timing pulses to one or another of the unsymmetrical inputs, depending upon whether the succeeding cell is to receive a "1" or a "0."

The present invention has for its object to provide a method of writing control with corrections of the writing wave form, by means of which the number of errors in interpretation or faults is greatly reduced in the reading, without the complete reading arrangement having to be in any way modified.

It appears to be more logical to define the aforesaid "significant" edge as a "digital" edge, and the aforesaid "non-significant" edge as a "limit" edge.

Thus, in accordance with the invention, the writing correction method consists in backwardly shifting any limit edge when it is followed by a change of digit. In other words, this amounts to delaying the appearance of the said limit edge by a fraction of the digit period in relation to the theoretical limit between neighbouring cells.

In accordance with the invention, for applying the writing method with correction, there is employed a writing control arrangement of the above-indicated type, with in addition a further information register and a digit comparator. The registers are so designed that, at a given comparison instant, the first register contains the digit to be written in a certain digit period, and the further register contains the following digit to be registered in the succeeding digit period. The comparator is connected to the outputs of the two information registers, and it influences not only the logical circuits controlling the timing pulses of the second train at the unsymmetrical inputs of the writing flip-flop, but also further logical circuits for controlling the application to these same inputs of the pulses of an additional timing pulse train, which are delayed in relation to the pulses of the said second train.

The control effected is such that, instead of a pulse of the second timing train, it is a pulse of the further timing train which is applied to one or the other of the two unsymmetrical inputs when the comparator has detected the fact that the succeeding digit is different from the digit to be written in the succeeding period.

Of course, other writing control arrangements could be adapted for use in the previously indicated correcting method.

The features of the invention, and the manner in which it is applied, will be more clearly apparent from the following description and with reference to the accompanying drawings, in which.

Figure 1:
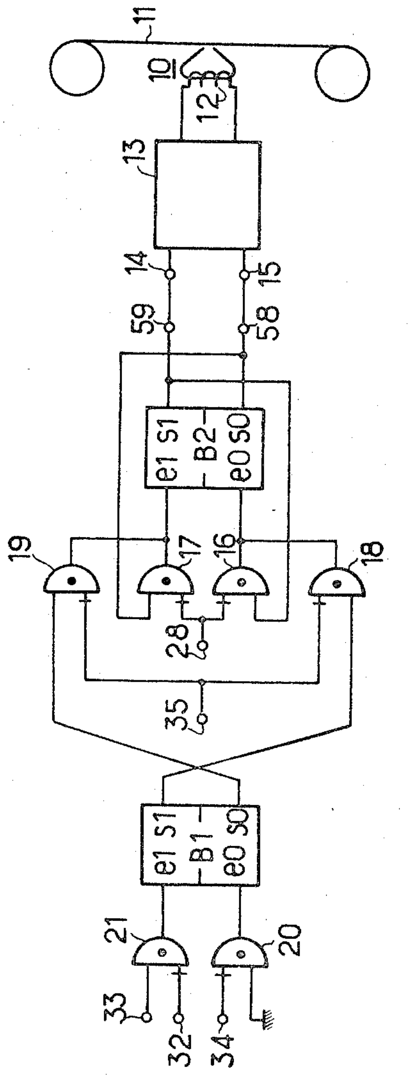
FIGURE 1 is a diagram illustrating the principle of a writing control arrangement similar to a known arrangement.

The operation of a phase-modulation writing arrangement of known type will first be briefly examined, for which purpose reference will be made to FIGURE 1. The reading head 10 is arranged to be normally in contact with the magnetic tape 11, which is assumed to be in movement.

When the winding 12 of the head 10 is traversed by a sufficient current flowing in a predetermined direction, the air gap of the head imparts to the magnetic layer a magnetic induction of a first polarity, and when this current is of opposite direction the magnetic layer acquires a magnetic induction of a second polarity opposite to the first. The winding 12 is supplied by a device 13, called a writing amplifier. Such a device is well known and need not be described in detail. It is sufficient to recall that it may be so designed that if a voltage of high level and a voltage of low level are applied to the input terminals 14 and 15 respectively, the writing current flowing through the winding 12 is of a first direction, and if the said voltages are reversed at the input terminals, the said writing current is of opposite direction.

The bistable flip-flop B2 forms with the logical circuits 16 to 19 associated therewith a writing control device. With regard to the bistable flip-flop B1, of which the states of conduction are determined by the logical circuits 20 and 21, it constitutes a register intended to store successively the binary digits of the information which are to be recorded, or written, on the magnetic tape.

The general operation of this arrangement will later be dealt with, and reference will now be made to FIGURE 2 which shows as an example of an embodiment the detailed circuit diagram of the bistable flip-flop B2 and of the logical circuits 16 and 17 of FIGURE 1. There will readily be recognised the component parts of a flip-flop circuit comprising the transistors T1 and T0 of PNP type, and the various conventional capacitors, resistors and diodes. It is known that such a flip-flop may be in either one of two states of conduction, in one of which the transistor T0 is conductive and the transistor T1 non-conductive, while in the second it is the transistor T1 which is conductive and the transistor T0 non-conductive. By convention, the first state of conduction may be defined as the state "0," and the second as the state "1." Taking account of the supply voltages indicated in FIGURE 2, when the flip-flop is in the state "0" a voltage of high level, i.e. about 0 volt, is available at the output terminal so, while a voltage of low level, i.e. about −3 volts, is available at the output terminal *s*1. When the flip-flop is in the state "1," these same voltages are reversed and are present at the output terminals *s*1 and so respectively.

It may be desirable to indicate here other conventions hereinafter adopted, namely:

(1) the control signals are brief pulses of positive polarity;

(2) a high voltage level means authorisation of the passage of a signal, while a low voltage level means inhibition of the passage of the signal;

(3) the properties of the logical circuits are valid only in relation to positive-going pulses or to high voltage levels.

Each of the logical circuits 16 and 17 performs the "AND" function and is composed of two diodes, a capacitor and two resistors. It will be recalled that if a brief pulse is applied to the anode of the diode 22 it is transmited to the output, after differentiation by the capacitor 23 and the resistor 24, only if a high voltage is applied at this instant to the anode of the diode 25, the output in question being the junction point 26. This junction point is connected through the isolating diode 27 to the input terminal *e*0 and also to the base of the transistor T1. The terminal 28G is connected to the anode of the diode 22, and the terminal 28D is connected to the corresponding diode of the AND circuit 17. The terminals 28G and 28D are in practice electrically connected and form the symmetrical input terminal 28 of FIGURE 1.

Figure 2:
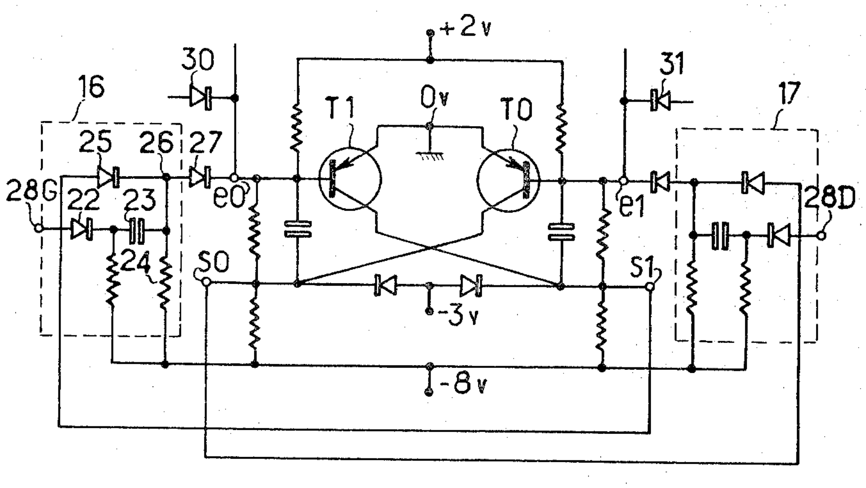
FIGURE 2 is the electrical circuit diagram of a bistable flip-flop comprising transistors, and of the logical circuits associated therewith.

It may be seen that the anode of the diode 25 is directly connected to the output terminal *s*1 and that the anode of the corresponding diode of the AND circuit 17 is directly connected to the output terminal so, in accordance with the basic diagram of FIGURE 1.

The anode of a diode such as 22 constitutes a first input, and the anode of a diode such as 25 constitutes a second input, which is controlled by a voltage level. In order to complete what has been stated in the foregoing, it may be added that if a brief pulse is applied to the first input it will be transmited to the output even if the high voltage level suddenly falls at the beginning of the said brief pulse. It is by reason of this feature that it has been stated that an AND circuit of this type performs the function of a temporary store or incorporated delay. Owing to this feature, shift registers or pulse counters formed of bistable flip-flops and of such logical circuits have been designed which give simplified and economic structures.

By reason of the aforesaid crossed connections, it is considered that the terminal 28 is a "symmetrical" input in the sense that a brief pulse applied to this input is capable of reversing the state of conduction of the flip-flop B2 regardless of its state of conduction during or just before the application of the said pulse.

The diodes such as 30 and 31 serve to connect the outputs of the logical circuits 18 and 19 respectively to the inputs e0 and e1 of the flip-flop. The latter logical circuits have not been illustrated, but they are identical to the AND circuits 16 and 17. The inputs e0 and e1 are called "unsymmetrical" or "separate" because of a brief pulse applied to the input *e*0, for example, reverse the state of conduction of the flip-flop only if the latter was in the state "1" just before this pulse, and because a brief pulse applied to the input *e*1 reverses the state of conduction of the flip-flop only if the latter was in the state "0." In the digaram of FIGURE 1, the first input of an AND circuit receiving a brief pulse has been symbolically represented by a small transverse stroke at the connection extending to this input, the second input being controlled by a voltage level.

The digit register B1 is of identical construction to the writing control flip-flop B2, and the AND circuits 20 and 21 are identical to the AND circuits previously described. The lower input of the AND circuit 20 is shown as connected to earth, i.e. to the high level potential, and this AND circuit is therefore constantly conductive.

The operation of this arrangement will be more readily explained with reference to a concrete example for which the graphs of FIGURE 5 have been prepared. In this figure, the digits on the line B represent a series of digits to be recorded by phase modulation along a track on a magnetic tape, when they have been stored in the register B1. The vertical chain lines define the successive digit periods *t*0–*t*1, *t*1–*t*2, etc., each period having a duration of 20μs. (microseconds), for example. The line A contains the same set of digits, but with an advance of one digit period.

On the line C, the wave form represents both the writing current flowing through the winding of the writing head, in relation to a horizontal line of zero value (not shown), and the output voltage available at the output *s*1 of the writing control flip-flop B2. In order to write a "0," it is necessary for the said flip-flop to change from the state "1" to the state "0," and in order to write a "1" it is necessary for this flip-flop to change from the state "0" to the state "1." All this is represented by a digital edge at the middle of each period starting from the time *t*1.

There are shown along the lines D to G a number of clock or timing pulse trains having a repetition period of 20μs. While the beginning of each pulse of the train D coincides with the beginning of a digit period, each pulse of the train E is delayed by 2μs., and each pulse of the train F is delayed by 2.5μs. With regard to the pulses of the train G, they are delayed by 10μs. or phase-shifted by a digit half-period in relation to those of the train D. The pulses of the train D are applied on the one hand to the input terminal 34, FIGURE 1, and on the other hand to the input terminal 35. The pulses of the train F are applied to the input terminal 32.

There is shown on the line H the wave form of the control voltage applied to the terminal 33. The control voltage H is supplied by any appropriate known means such as, for example, the central control unit of a data-processing plant. There is shown on the line J the sequence of pulses received at the input *e*1 for the introduction of the "1s" into the flip-flop B1. The wave forms K and L represent the output voltages available at the output terminals *s*1 and *s*0 respectively of the flip-flop B1.

Since the registers B1 and B2 operate substantially in the manner of two stages of a shift register, it must be pointed out that a digit is not written at the same time as it is contained in the register B1, but with a delay of one digit period. Thus, the two digits 1 contained in B1 in the course of the periods *t*2–*t*3 and *t*3–*t*4 are written (line C) only at the middle of the periods *t*3–*t*4 and *t*4–*t*5.

It has been seen that the pulses of the train G, which are constantly applied to the symmetrical input 28 of the control flip-flop B2, are capable of changing it over to produce a digital edge at the centre of each period. In order to control the writing of 1 or 0, it is necessary to determine the state of B2 at the beginning of the period under the control of the register B1, which itself is brought into the desired state at the beginning of the preceding digit period. Referring to FIGURE 5, line C, it may be seen that at the instant *t*1 and *t*2 the flip-flop B2 must be brought into the state "1" because a "0" must thereafter be written at the middle of each succeeding period. On the other hand, at the instant *t*3 and *t*4, the flip-flop B2 must be brought into the state "0" because a "1" must thereafter be written at the middle of each succeeding period. This explains why, in FIGURE 1, the output *s*0 of B1 is coupled through the AND circuit 19 to the input *e*1 of B2, and why the output *s*1 of B1 is coupled through the AND circuit 18 to the input *e*0 of B2.

Observation of the following shows that the assembly thus described does in fact operate satisfactorily.

At the instant *t*1, since the register B1 contains the value "0," the output value at *s*0 is high, line L, and only the AND circuit 19 is conductive. The pulse of the pulse train D, which is received at the terminal 35 at this instant, is transmitted to the input terminal *e*1 of the flip-flop B2, thus changing the latter to the state "1." The same events occur in identical manner at the instant *t*2. After a period of time equal to 2.5$\mu$s., the flip-flop B1 contains the first 1 to be written. It follows that, although the register B1 is returned to the state "0" at the instant *t*3, the AND circuit 18 remains conductive by reason of the temporary storage effect previously referred to, and the present pulse of the train D is now directed to the input *e*0 of the flip-flop B2. However, since the latter is already in the state "0," this pulse remains ineffective. The same is not the case at the instant *t*4, when a further pulse is received also by the input *e*0 of the flip-flop B2, which pulse has the effect of bringing the latter from the state "1" to the state "0."

Thus, in normal writing, the limit edges discernible in the pulses of the writing current coincide with the limits of the digit periods.

It has been observed from a number of systematic tests that some parts of cells magnetised on the tape appear to be constricted in relation to the others. This distortion is heightened at the time of the reading of the magnetic tape when the distance between the magnetic head and the magnetised layer of the tape is accidentally increased. Since variations of this distance are difficult to avoid in practice, corrections could be made to the lengths of the magnetised cells at the time of the writing by varying the position, either of all the digital edges or of all the limit edges of the pulses of the writing current. In accordance with the invention, a position correction is made only to certain limit edges. The rule applied consists in that no correction is made when a limit edge is followed, at the beginning of the succeeding digit period, by another limit edge. On the other hand, a limit edge must be delayed by a fraction of the duration of a digit period if no limit edge exists at the beginning of the succeeding period, that is to say, when a change of digit takes place.

Figure 5:
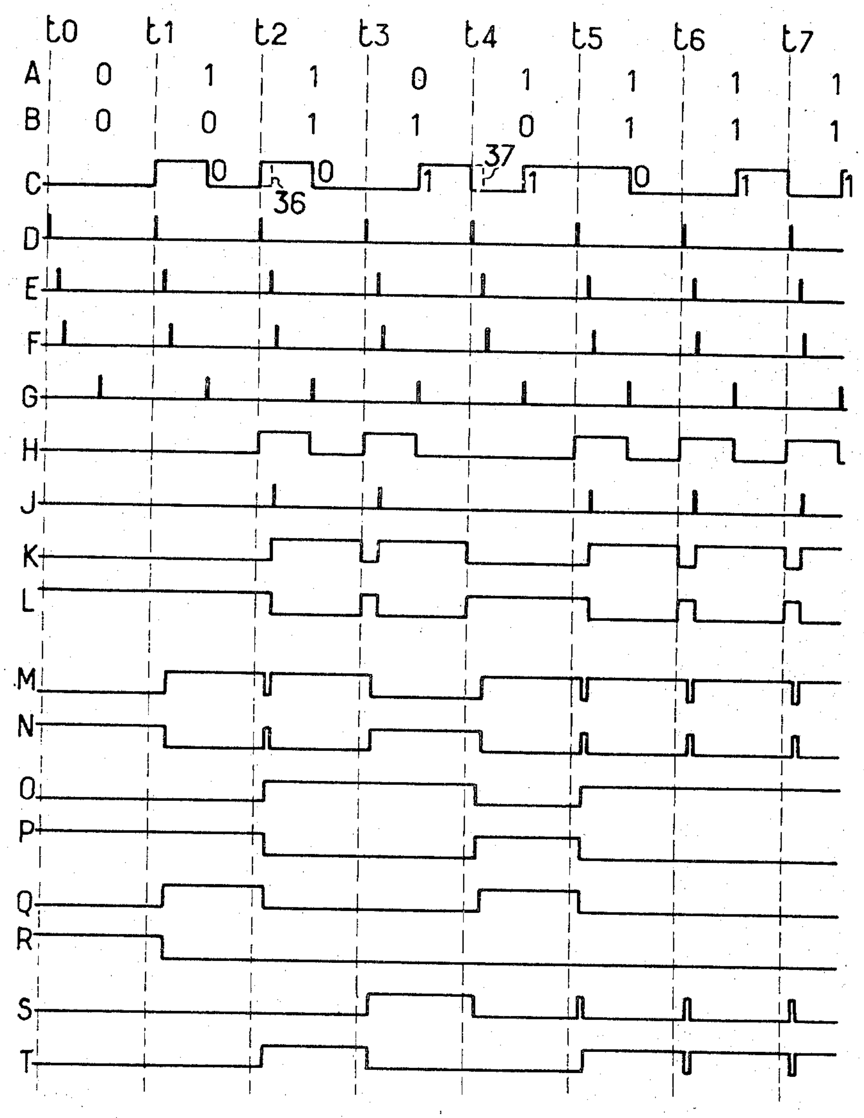
FIGURE 5 is a graph of the pulse trains employed and of the control voltages, serving to explain the operation of the two described arrangements.

Referring to FIGURE 5, it may be seen from the wave form of the line C that two limit edges must be delayed in accordance with the chain lines 36 and 37.

Figure 3:
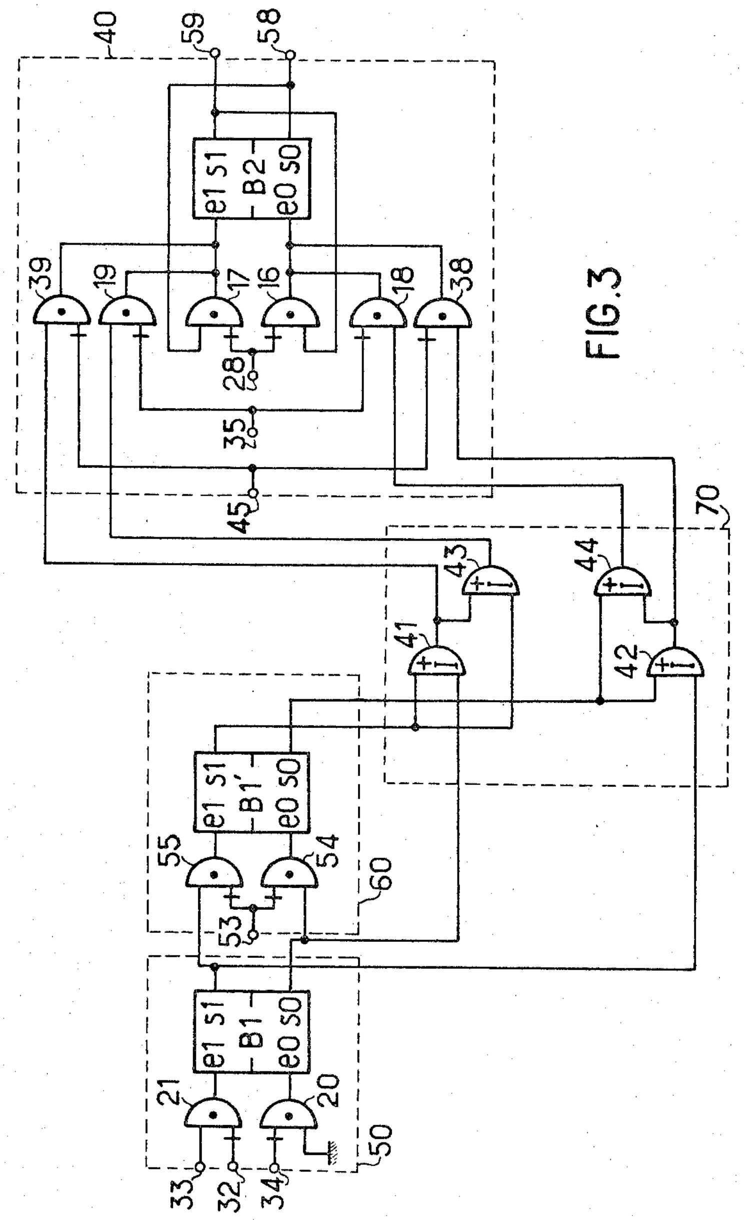
FIGURE 3 is a diagram illustrating the principle of a writing control arrangement according to the invention.

In order to obtain these results, an improved writing control arrangement has been designed, which will be examined with reference to FIGURE 3. In this figure, the unchanged or equivalent elements bear the same reference numerals as in FIGURE 1.

The writing control device 40 comprises as before a bistable flip-flop B2, having the output terminals 58, 59 and the AND circuits 16 to 19. It will be assumed that the output terminals 58, 59 are again connected to the inputs 15, 14 of the writing amplifier of FIGURE 1. Two AND circuits 38 and 39 have been added and their outputs are connected to the unsymmetrical inputs *e*0 and *e*1 of the flip-flop B2 respectively. Two digit registers 50 and 60 are now provided, each of which is composed of a bistable flip-flop B1, B1' associated with logical input circuits. A digit comparator 70 is composed of four logical circuits 41 to 44. The latter have their inputs connected to the outputs of the flip-flops B1 and B1' as illustrated in the diagram of FIGURE 3. Their outputs supply control voltages to a corresponding input of the AND circuits, 18, 19, 38 and 39.

Figure 4:
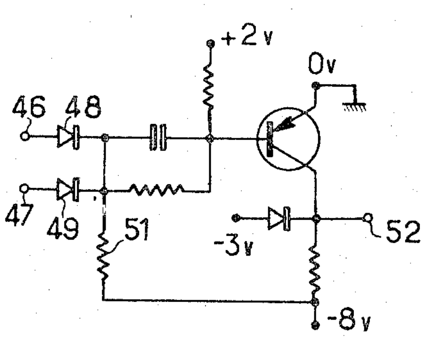
FIGURE 4 is the electrical diagram of a logical inverting-OR circuit, also known as a NOR circuit.

Each of the logical circuits 41 to 44 must perform the NOR functions. A know electronic device which may be suitable is illustrated by the diagram of FIGURE 4. There will be seen therein the usual parts of an inverter-amplifier comprising one transistor. The input terminals 46, 47 arrive directly at the anodes of the two diodes 48, 49 forming, with the resistor 51, and OR circuit. It is known that it is sufficient for a high voltage (for example 0 volt) to be applied to either one of the input terminals in order that the transistor may be rendered non-conductive and a voltage of low level may thus be present at the output terminal 52. A voltage of high level is available at this output only when the transistor is conductive, that is to say, during the time when the voltages applied to the input terminals 46, 47 are both of low level (for example −3 volts).

Reference will again be made to FIGURE 3. Concerning the first digit register 50, the input terminal 33 again receives the control voltage represented by the wave form H of FIGURE 5, but with a relative advance of one digit period while the terminal 32 again receives the pulses of the timing pulse train F. The terminal 34 now receives the pulses of the train E. The pulses of the train E are also applied to the terminal 53, which is connected to the first inputs of the AND circuits 54 and 55. At the instant of each pulse E, the transfer of the information contained in the flip-flop B1 to the flip-flop B1' is effected. The inputs of the logical circuits of the comparator 70 are connected to the outputs of the flip-flops B1 and B1' so as to compare the digit to be written which is stored in B1' with the succeeding digit stored at the same instant in B1.

In accordance with the preceding example of operation, and therefore in order to write the binary sequence 0011011, etc., in FIGURE 5, the wave forms M and N represent respectively to output voltages available at the outputs *s*1 and *s*0 of the flip-flop B1. The wave forms O, P represent the output voltages available at the outputs *s*1 and *s*0 of the flip-flop B1' respectively. The wave forms Q, R, S and T represent the output voltages available at the outputs of the logical circuits 41, 43, and 42 and 44 respectively.

It may be observed, line M, that the introduction of the first 1 into the flip-flop B1 takes place 2.5$\mu$s. after the instant *t*1, i.e. with a time advance of one digit period in relation to the preceding example (line K), and therefore in correspondence with the binary digits shown on line A. The transfer of this first 1 into the flip-flop B1' takes place 2μs. after the instant t2.

It may be seen, line R, that at the instant t1 the output voltage is high at the output of the logical circuit 43 of the comparator 70, which indicates that the two digits contained in the flip-flops B1 and B1' were "0's" during the period t0–t1. Consequently, only the AND circuit 19 is conductive and a pulse D is applied to the input e1 of the flip-flop B2, which brings about the appearance of a positive-going limit edge (line C). It may be seen that two microseconds after the instant t2, line Q, the output voltage was high at the output of the logical circuit 41, which indicates that the digit to be written was a "0" and that the succeeding digit a "1" in the course of the period t1–t2. The AND circuit 39 therefore has time to transmit a pulse E to the input e1 of the flip-flop B2, due to which the limit edge is this time delayed as illustrated at 36, line C. At the instant t3, a high output voltage is present at the output of the logical circuit 44 (line T). Therefore, only the AND circuit 18 is conductive and it permits the transmission of a pulse D to the input e0 of the flip-flop B2, but since the latter is already in the state "0," its state does not change. Two microseconds after the instant t4, the output voltage at the output of the logical circuit 42 again becomes low (line S), but the AND circuit 38 has time to transmit a pulse E to the input e0 of the flip-flop B2, thus producing a delayed limit edge, as illustrated at 37, line C.

The means for generating the timing pulse trains D to G have not been illustrated, because various types of known generators are suitable provided that they can supply pulses of positive polarity having an amplitude of 3 volts and a maximum duration of 0.5μs., with the indicated frequency and phase differences.

It would be possible to omit the delay of one digit period between the instant when a digit to be written is contained in the register 60 and the instant when it is effectively written under the control of the control device 40. In this case, no modification to the circuits or connections would be necessary. The pulse train F would simply have to be replaced by two other pulse trains, which will be called F1 and F2. Each pulse F1 would be produced 1μs. before a pulse D and each pulse F2 would be produced 0.5μs. before a pulse D. The terminal 32, FIGURE 3, would receive the pulses F2 and the pulses F1 would be applied to the terminals 34 and 53. The operation would be exactly the same apart from the fact that the binary digits would be written at the same time as they were stored in the register 60. Nevertheless, since the introduction of the "1's" digits into the register 50 must take place a little earlier (wave form H further advanced by at least one microsecond), the transmission delay would not be so reduced.

The writing control arrangement just described in detail by way of example could be constructed with means performing the required functions but derived from different technologies from that which has been shown. The corresponding modifications are obviously within the scope of the person skilled in the art.

I claim:

1. A control circuit arrangement for writing a string of binary digits on the recording cells of a moving magnetisable medium through magnetisation inversions at the middle of each cell comprising:

a current generator for feeding the winding of a magnetic head with a current flowing in one sense or in the opposite sense under the influence of a binary control signal;

a first binary element having two states of conduction and being connected for controlling said generator, said element further having a symmetrical input and two separate inputs;

input circuit means connected for applying a first series of clock pulses to the symmetrical input of said element for inverting the state thereof at mid-time of each cell or digit period;

a first pair of logical circuits connected for transmitting to one or the other of the separate inputs of said element the pulses of a second series of clock pulses timed at the beginning of each digit period;

a second pair of logical circuits connected for transmitting to one or the other of the separate inputs of said element the pulses of a third series of clock pulses, which series is delayed with respect to said second series of clock pulses;

a second binary element;

a third binary element, the latter elements being interconnected and controlled so that at each digit period they respectively store the binary digit to be written on the next following digit period and the binary digit to be written on the second following digit period;

and a comparing device consisting of logical circuits whose inputs are connected to outputs of said second and third binary elements and whose outputs are connected to control said first pair of logical circuits and said second pair of logical circuits, whereby at each beginning of a digit period a pulse of said second series or a pulse of said third series is applied to one of the separate inputs of said first binary element according to whether the digit to be written and the following digit are identical or different.

2. A control circuit arrangement as claimed in claim 1, wherein, for writing each of binaries 1 and 0 through the intermediary of said first binary element, said comparing device comprises a pair of "NOR" logical circuits, each pair having two inputs connected to opposite outputs of said second and third binary elements and two corresponding outputs connected to control the logical circuits relative to a distinct separate input of said first binary element.

3. A control circuit arrangement as claimed in claim 2, wherein said first binary element includes a bistable circuit in which each of its separate inputs is controlled by the outputs of a pair of "AND" logical circuits, a first "AND" circuit of said pair receiving at one of its inputs said second series of clock pulses and a second "AND" circuit of said pair receiving at one of its inputs said third series of clock pulses.

4. A control circuit arrangement as claimed in claim 2, wherein said second and third binary elements are each composed of a bistable circuit with two outputs and two inputs, and wherein there are provided logical circuit means interconnecting and controlling the two bistable circuits so that the latter operate as a two-stage shift register.

5. A control circuit arrangement for recording a succession of binary digits on recording cells of a moving magnetisable medium by the phase modulation process, comprising:

a current generator for feeding the winding of a magnetic head with the current flowing in one sense or in the opposite sense under influence of a binary control signal;

a bistable circuit device connected for controlling said generator and having two separate inputs and one symmetrical input, the latter receiving a first series of clock pulses each for unconditionally reverting the conduction state of said device at mid-time of each digit period;

a first pair of coincidence circuits connected for transmitting to one or the other of the separate inputs of said device pulses of a second series of clock pulses, one pulse thereof occurring at the beginning of each digit period;

a second pair of coincidence circuits connected for transmitting to one or the other of the separate inputs of said device pulses of a third series of clock pulses delayed by a fraction of one digit period in relation to those of said second series;

a two-stage shift register including second and third bistable circuit devices each with two inputs and two outputs and made operative at the end of each digit period to respectively store the digit to be recorded during the next following digit period and the digit to be recorded during the second following period;
and a comparing device consisting of two pairs of "NOR" logical circuits, each pair having two inputs connected to opposite outputs of said second and third bistable circuit devices, each pair further having two corresponding outputs connected to control the coincidence circuits relative to a distinct separate input of said first bistable circuit device, the arrangement being such that, at the beginning of each digit period, a pulse of said second series or a pulse of said third series is applied to one of the separate inputs of said first bistable circuit device according to whether the binary digit to be next recorded and the following binary digit are equal or different.

References Cited

UNITED STATES PATENTS

| | | | |
|---|---|---|---|
| 3,159,840 | 12/1964 | Woo | 346—74 |
| 3,235,855 | 2/1966 | Woo | 346—74 |
| 3,237,176 | 2/1966 | Jenkins | 340—174.1 |
| 3,299,414 | 1/1967 | Sims | 340—174.1 |

BERNARD KONICK, *Primary Examiner.*

A. I. NEUSTADT, *Assistant Examiner.*